Feb. 7, 1967 E. A. BEDELL, JR., ET AL 3,303,292

MAGNETIC HEAD ASSEMBLY

Filed Feb. 25, 1963

EDWIN A. BEDELL JR. &
BURNET M. POOLE
INVENTORS

BY Nathan N. Kallman

ATTORNEY 3,303,292

MAGNETIC HEAD ASSEMBLY

Edwin A. Bedell, Jr., Redwood City, and Burnet M. Poole, Los Altos, Calif., assignors to Ampex Corporation, Redwood City, Calif., a corporation of California Filed Feb. 25, 1963, Ser. No. 260,465
11 Claims. (Cl. 179—100.2)

This invention relates to a novel and improved magnetic transducer or head assembly, and in particular to a magnetic head that is used for wideband signal recording and reproducing.

Although the magnetic head assembly of this invention will be described with relation to wideband signal systems, it should be understood that the inventive head may be utilized for other transducing purposes.

Magnetic tape apparatus generally includes magnetic heads or transducers for recording and reproducing infomation signals on a magnetic tape. Such heads may be formed from magnetic materials such as Permalloy or ferrite, for example, and may be constituted as cores or as laminated structures. Presently known magnetic heads that are used for wideband recording and playback, such as for video or television signal operation, generally utilize a magnetic core formed from a ferrite material. Ferrites have a high permeability characteristic and are particularly useful fo high frequency signal operation. Also, ferrites are known to have high resistivity at high frequencies, thus making eddy-current losses low and lamination unnecessary. However, ferrite material is inherently brittle and porous, and therefore magnetic transducers that employ only ferrite in the core structure generally have poor definition at the nonmagnetic gap, in addition to nonuniformity of gap length. Furthermore, ferrite material is difficult to shape and machine, and substantial waste and loss are encountered during manufacture of head assemblies.

Therefore, some types of magnetic head assemblies utilize hard metallic pole pieces to make the manufacture of the magnetic head more expedient, and to reinforce the gap structure. By way of example, Alfenol pole pieces may be secured on either side of the gap to prevent degradation of the ferrite material in the area of the gap during recording or playback. Alfenol is an alloy having a composition of approximately 16% aluminum and 84% iron, and a permeability of about 5000. However, for high frequency application, such as in the 5–6 megacycle range, the conductive Alfenol has poor magnetic properties and a permeability of about 95 on the average.

Also changes in temperature and other ambient conditions that accompany the manufacturing operation detrimentally affect the permeabilities of the ferrite and the Alfenol, especially during the heat treating process, whereby the electrical and magnetic characteristics of these materials are degraded. Thus, the final magnetic head assembly experiences a marked diminution in performance capabilities.

Wideband signal systems that are employed for high frequency or video recording, such as described in U.S. Patent No. 2,866,012, utilize a rotary head drum assembly carrying a plurality of magnetic transducers with projecting magnetic pole tips that scan a magnetic tape transversely at high speeds. The pole tips that contact the tape wear rapidly, and such wear affects the definition of a nonmagnetic gap delineated by such tips. Poor gap definition, in turn, affects the resolution of the signal being transduced. Therefore, the materials used for each head or transducer should be long wearing, if possible, to minimize maintenance and replacement costs. In addition, the head material for the core and poles should have optimum electrical and magnetic characteristics.

A magnetic material that has a very high permeability and a high saturation characteristic is a magnetic alloy consisting of silicon, aluminum and iron. This magnetic alloy, hereinafter called Alfesil, is described in U.S. Patent No. 2,193,768, and has many advantageous features. For example, Alfesil is much harder than Alfenol and therefore wears better, and also has a very low hysteresis loss. In addition, the permeability of Alfesil is not downgraded by high temperatures that are experienced during annealing or brazing. It would be desirable to utilize an alloy such as Alfesil in a magnetic head assembly to gain these advantages.

An object of this invention is to provide a novel and improved magnetic head assembly.

Another object of the invention is to provide a magnetic head assembly that is easy to manufacture, and which retains the features of high permeability and resistivity after the manufacturing process.

According to this invention, a magnetic head assembly comprises a combination of a metallic magnetic core and a nonmetallic magnetic body joined to said core. The joined core and body includes an aperture that accommodates a transducing coil or winding. A nonmagnetic gap is formed in the magnetic core and extends from a front gap area located at a tape engaging surface to a rear gap area disposed adjacent to the aperture. The nonmetallic body has a slot formed at one end that straddles the rear gap area to enhance the operating characteristics of the transducer assembly at high frequencies.

In a particular embodiment of the invention, the metallic magnetic core is formed from an alloy of aluminum, iron and silicon, designated as Alfesil, hereinafter. The nonmetallic magnetic body is preferably a ferrite material that is joined by an epoxy bond to the Alfesil core. In addition, the rear gap area includes a brazed portion that facilitates construction of the transducer, and enhances the operating characteristics of the magnetic head assembly.

The invention will be described in greater detail with reference to the drawing in which.

Figure 1:
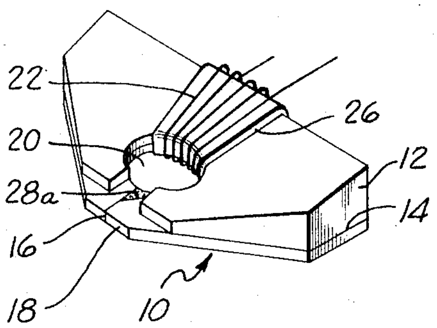
FIGURE 1 is a perspective top view of a magnetic transducer assembly, in accordance with the invention.
Figure 3:
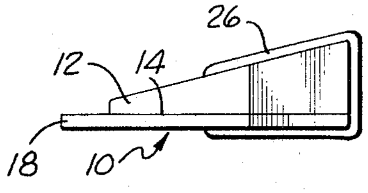
FIGURE 3 is a side elevation view of the head assembly, illustrated in FIGURE 2.
Figure 2:
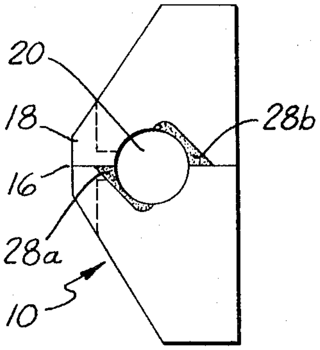
FIGURE 2 is a plan bottom view of the inventive assembly, shown without a coil for clarity of illustration.

With reference to FIGURES 1, 2 and 3, a magnetic transducer assembly comprises a metallic magnetic core 10 and a nonmetallic magnetic body 12 that is joined to the core 10 by an epoxy bond 14. A very narrow nonmagnetic gap 16 is formed in the core 10 and extends in one direction to a front gap surface 18. In a transverse scan type magnetic tape apparatus, such as used for television recording, the front gap surface 18 engages a moving tape and sweeps across the tape to form transverse tracks of information during a recording operation; and scans such recorded tracks during playback to retrieve the information. The gap 16 also has a rear gap area that terminates at an aperture 20, which serves to accommodate a transducing coil 22 that is wound about the integral structure formed by the magnetic core 10 and magnetic body 12. Although the winding 22 is preferably an insulated wire coil, an additional insulating layer 26 may be disposed between the core and body assembly and the coil to avoid the possibility of a short circuit during operation.

The core 10 is formed preferably from an alloy of aluminum, iron and silicon, such as defined in U.S. Patent No. 2,193,768. By way of example, the alloy (Alfesil)

may be 6% aluminum, 84.5% iron and 9.5% silicon. It has been found that a magnetic core made of Alfesil alone and having an associated transducing coil performs effectively as a magnetic transducer at audio frequencies, and may even be employed for transducing signal frequencies up to one megacycle per second. However, when operating at video frequencies in the 4–6 megacycle range, the reluctance of Alfesil becomes too high, and therefore there is a decreased electromotive force realized during the playback process, and consequently a reduced signal output. Applicants have discovered that combining a high permeability material, such as ferrite, with the Alfesil core provides a magnetic transducer that is superior to prior art transducers in both wear and high frequency capabilities. In general, ferrites have a high resistivity (approximately $10^6$ ohms/cm.$^3$), and the skin effect of ferrites at high frequencies is relatively small. The ferrite improves the efficiency of the magnetic head, especially at high frequencies, by shunting the reluctance of the rear magnetic path of the Alfesil core 10 with a low reluctance path.

During manufacture, the Alfesil core 10 can be easily cut to size. The Alfesil does not require any heat treatment for shaping purposes, and its permeability is therefore not affected during processing. To facilitate the manufacture of the magnetic transducer, when forming the core 10, brazing material 28 is utilized to join two half sections to form the core 10. After joinder, the aperture 20 is formed by ultra-sonic or other drilling means, leaving a narrow brazed portion **28*a* adjacent to the rear portion of the front gap 16 in addition to a second brazed portion 28*b*** adjacent to the rear gap of the transducer assembly.

During operation, currents are induced in the low resistivity material of the nonmagnetic brazed section **28*a*, which serves as an eddy-current shield, thereby minimizing leakage current across the rear of the transducing gap 16. Also, the brazed section 28*a* has an angular portion terminating in a sharply defined point to demarcate the rear of the front gap 16**. In this manner, magnetic transducer assemblies having substantially the same dimensions, and similar electrical and magnetic operating characteristics may be manufactured. These similarities afford the use of a plurality of transducers spaced equally about a rotary drum, such as employed in wideband recorders, with a minimum of variation in operating characteristics.

In a particular embodiment of the invention, the Alfesil core has a thickness of .010 inch and a nonmagnetic gap of 80 microinches. The ferrite slab 12, which is wedge-shaped, is tapered at about 14.5 degrees from a thickness of less than .007 inch at one extremity to .025 inch at the other end. With a magnetic head of this construction, it is possible to process signals up to eight megacycles per second.

Figure 4:
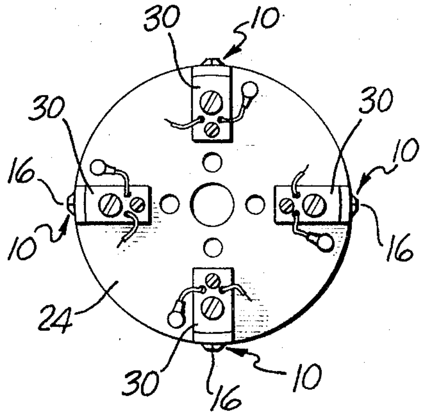
FIGURE 4 is a plan view of a rotary head assembly carrying a plurality of magnetic transducers of this invention.

In FIGURE 4, a rotary drum or disk 24, made from a nonmagnetic metal such as brass, is shown carrying a plurality of magnetic transducer assemblies of this invention. The rotary head drum 24 is of the type that is employed in transverse scan magnetic tape apparatus, and is rotated so that each of the projecting magnetic transducers successively contacts a longitudinally moving tape. Each magnetic transducer assembly is mounted in a shoe 30 that maintains the transducer in a fixed relation with respect to the periphery of the rotary head drum 24. Adjustments for head projection and azimuth are provided so that precise contact between each of the transducer tips 18 and the tape is established.

The magnetic head assembly of this invention affords better wear and increased head life, as well as improved performance at high frequencies. Manufacture of such a head assembly is more convenient and expedient than for prior known heads; and waste and rejection are substantially minimized.

While the foregoing description has been particularly directed to magnetic transducers used for video recording and reproducing where one or more heads are mounted on a rotating drum, it is to be noted that the structure and principles set forth are not limited to such application. Much emphasis is being placed and effort expended in extending the bandwidth capabilities of instrumentation and computer type recorders having transducers mounted in fixed relation to a moving tape, and the present composite core structure of metallic and nonmetallic portions is applicable to such recorders for the same stated reasons and advantages. Also, the structure of the invention is useful for single or multiple channel operation.

What is claimed is:

1. A magnetic head assembly comprising:
a metallic magnetic core;
a nonmetallic magnetic body joined to and against one side of said core, said joined body and core having an aperture formed through both the body and core; and
coil means disposed through said aperture for coupling an electrical signal to said core and said body.

2. A magnetic head assembly having a front transducing gap and a rear gap comprising:
a metallic magnetic core defining therein said front transducing gap of a nonmagnetic material;
a wedge-shaped nonmetallic magnetic body joined directly to and against one side of said core wherein the portions of said core and said body in the region of said rear gap extend in continuous superimposed relation; and
a coil coupled to the superimposed portions of both said core and said body.

3. A magnetic head assembly comprising:
a magnetic core formed from an alloy of aluminum, iron and silicon, said core defining a nonmagnetic gap;
a nonmetallic magnetic body joined to said core; and
a transducing coil coupled to said core and said body.

4. A magnetic head assembly comprising:
a magnetic core formed from an alloy of aluminum, iron and silicon, said core defining a nonmagnetic gap;
a ferrite body joined to said core; and
means for coupling an electrical signal to said core and said body.

5. A magnetic head assembly comprising:
a magnetic core formed from an alloy of aluminum, iron and silicon, said core defining a nonmagnetic gap;
ferrite material disposed adjacent to said core and joined thereto; and
a transducing coil coupled to said core.

6. A magnetic head assembly comprising:
a magnetic core formed from an alloy of aluminum, iron and silicon, said core defining a nonmagnetic gap;
a wedge-shaped ferrite body joined by epoxy to one surface of said core;
an aperture extending through said joined core and body; and
a transducing coil coupled to said core and said ferrite body through said aperture.

7. A magnetic head assembly comprising:
a magnetic core formed from an alloy consisting of 6% aluminum, 84.5% iron and 9.5% silicon, said core defining a nonmagnetic gap;
a ferrite body joined to one surface of said core;
an aperture extending through said joined core and body; and
a transducing coil coupled to said core and said ferrite body through said aperture.

8. A magnetic head assembly comprising:
a metallic magnetic core defining a nonmagnetic transducing gap, having a rear gap portion;
a nonmagnetic body having a low resistivity disposed within said magnetic core for demarcating the limits of said rear gap portion, and for minimizing leakage current; and a ferrite body joined to such magnetic core.

9. A magnetic head assembly comprising:

a metallic magnetic core defining a nonmagnetic transducing gap, such gap having a rear gap portion delimiting the extent of the transducing gap;

a body of nonmagnetic brazing material disposed within said magnetic core adjacent to said rear gap portion demarcating the limits of said rear gap portion, such nonmagnetic body having a sharply defined point, and serving to minimize leakage of current; and a ferrite body joined to said magnetic core.

10. A magnetic head assembly comprising:

a metallic magnetic core defining a nonmagnetic gap;

a wedge-shaped ferrite body joined by epoxy to one surface of said core;

an aperture extending through said joined core and body;

a transducing coil coupled to said core and said ferrite body through said aperture; and brazing material disposed in portions of the core adjacent to said aperture and to said gap.

11. A magnetic head assembly comprising:

a pair of metallic magnetic core sections formed along an axis that defines a nonmagnetic gap, such gap having a front transducing gap and a rear gap, the front transducing gap also having a rear transducing portion;

an angular nonmagnetic body having low resistivity disposed within each section adjacent to the gap axis and offset relative to each other, the nonmagnetic body nearest to the front transducing gap precisely delimiting the rear transducing gap portion by a sharply tapered extremity;

a ferrite body joined to said core sections, said ferrite and core sections including an aperture; and a transducing coil coupled to said core sections and said ferrite through the aperture.

References Cited by the Examiner

UNITED STATES PATENTS

| | | | |
|---|---|---|---|
| 2,711,945 | 6/1955 | Kornei | 346—74 |
| 3,171,903 | 3/1965 | Wheeler et al. | 346—74 |

BERNARD KONICK, *Primary Examiner.*

J. R. GOUDEAU, A. I. NEUSTADT, *Assistant Examiners.*